US012769127B1

(12) United States Patent
Bhat et al.

(10) Patent No.: US 12,769,127 B1
(45) Date of Patent: Oct. 20, 2026

(54) DISPLAYS HAVING VARIED VIRTUAL OBJECT DISTANCE ACROSS FIELD OF VIEW

(71) Applicant: Apple Inc., Cupertino, CA (US)

(72) Inventors: Jerome C Bhat, Palo Alto, CA (US); Vikrant Bhakta, Santa Clara, CA (US); Barbara J Kruse, San Francisco, CA (US); Robert T Held, Seattle, WA (US); Hyungryul Choi, San Jose, CA (US); Nathanael D Parkhill, Menlo Park, CA (US); Cameron A Harder, San Francisco, CA (US)

(73) Assignee: Apple Inc., Cupertino, CA (US)

( * ) Notice: Subject to any disclaimer, the term of this patent is extended or adjusted under 35 U.S.C. 154(b) by 357 days.

(21) Appl. No.: 18/467,538

(22) Filed: Sep. 14, 2023

Related U.S. Application Data

(60) Provisional application No. 63/408,654, filed on Sep. 21, 2022.

(51) Int. Cl.
*G02B 27/01* (2006.01)

(52) U.S. Cl.
CPC .. *G02B 27/0172* (2013.01); *G02B 2027/0187* (2013.01)

(58) Field of Classification Search
CPC .................................................. G02B 27/0172
See application file for complete search history.

(56) References Cited

U.S. PATENT DOCUMENTS

| | | | |
|---|---|---|---|
| 5,568,207 | A | 10/1996 | Chao |
| 6,027,214 | A | 2/2000 | Graham |
| 6,244,705 | B1 | 6/2001 | Ledbetter et al. |
| 6,496,161 | B1 | 12/2002 | Tanaka |
| 7,840,444 | B2 | 11/2010 | Mellon et al. |
| 9,406,253 | B2 | 8/2016 | Blanche et al. |
| 10,609,363 | B2 | 3/2020 | Cheng et al. |
| 10,698,204 | B1 | 6/2020 | Ouderkirk et al. |
| 10,901,291 | B1 | 1/2021 | Sulai et al. |
| 11,269,180 | B2 | 3/2022 | Browy et al. |

(Continued)

FOREIGN PATENT DOCUMENTS

| | | | |
|---|---|---|---|
| WO | 2018138714 | A1 | 8/2018 |
| WO | 2018213010 | A1 | 11/2018 |
| WO | 2021146474 | A1 | 7/2021 |

*Primary Examiner* — Edmond C Lau
(74) *Attorney, Agent, or Firm* — Treyz Law Group, P.C.; Michael H. Lyons

(57) ABSTRACT

A display may include waveguides that direct image light overlaid with world light to eye boxes within a field of view (FOV). Lenses may transmit the image and world light to the eye boxes and may have different powers at different elevation angles across the field of view. This may serve to place virtual objects from the image light at different image distances when the virtual objects are in different portions of the FOV. For example, the lenses may place the virtual objects at closer image distances within lower portions and farther image distances within higher portions of the FOV to align the image distances with the most likely distances to external objects from the world light, thereby mitigating focus conflict. The virtual objects may be adjusted based on a gaze tracking location to overcome vergence accommodation conflict and/or to compensate for different positions of the user's eyes.

14 Claims, 5 Drawing Sheets

(56) References Cited

U.S. PATENT DOCUMENTS

| | | | |
|---|---|---|---|
| 11,287,663 | B2 * | 3/2022 | Lo ........................ G02B 27/144 |
| 2005/0099526 | A1 | 5/2005 | Wu et al. |
| 2010/0271587 | A1 | 10/2010 | Pavlopoulos |
| 2012/0120498 | A1 | 5/2012 | Harrison et al. |
| 2013/0127980 | A1 | 5/2013 | Haddick et al. |
| 2014/0192426 | A1 | 7/2014 | Wu |
| 2016/0085300 | A1 | 3/2016 | Robbins et al. |
| 2017/0045742 | A1 * | 2/2017 | Greenhalgh ....... G02B 27/0081 |
| 2017/0092235 | A1 | 3/2017 | Osman et al. |
| 2020/0174255 | A1 * | 6/2020 | Hollands ............ G02B 27/0103 |
| 2021/0199974 | A1 | 7/2021 | Chan et al. |
| 2022/0171215 | A1 * | 6/2022 | Danilova ................ G02F 1/294 |
| 2022/0326528 | A1 | 10/2022 | Haddick |

* cited by examiner

DISPLAYS HAVING VARIED VIRTUAL OBJECT DISTANCE ACROSS FIELD OF VIEW

This application claims the benefit of U.S. Provisional Patent Application No. 63/408,654, filed Sep. 21, 2022, which is hereby incorporated by reference herein in its entirety.

BACKGROUND

This disclosure relates to optical systems such as optical systems in electronic devices having displays.

Electronic devices can include displays that provide images near the eyes of a user. Such electronic devices often include virtual or augmented reality headsets with displays having optical elements that allow users to view the displays. If care is not taken, components used to display images can be bulky and might not exhibit desired levels of optical performance.

SUMMARY

An electronic device may have a display system for providing image light to eye boxes. The display system may include waveguides. Projectors may generate image light containing a virtual object. Input couplers may couple the image light into the waveguides. Output couplers may couple the image light out of the waveguides and towards the eye boxes. The eye boxes may have a field of view (FOV). The output couplers may also pass world light from external objects to the eye boxes within the FOV.

Lenses may transmit the image light and the world light from the output couplers to the eye boxes. The lenses may have different powers or focal lengths at different elevation angles across the field of view. This may serve to place the virtual objects at different virtual image distances (VIDs) when the virtual objects are in different portions of the FOV. For example, the lenses may place the virtual objects at closer VIDs within lower portions of the FOV and may place the virtual objects at farther VIDs within higher portions of the FOV. This may help to align the VIDs with the most likely distances to the external objects viewed with the display, thereby mitigating focus conflict and maximizing viewing comfort. Additional lenses may be used to reverse the effects of the lenses on the world light.

Gaze tracking sensors may identify a user's gaze location and the virtual objects may be adjusted based on the gaze location to overcome vergence accommodation conflict and/or to compensate for different positions of the user's eyes relative to the eye boxes. The virtual objects may also be adjusted when in a transition region of the FOV between near and far focusing regions of the FOV to optimize the appearance of the virtual objects.

DETAILED DESCRIPTION

Figure 1:
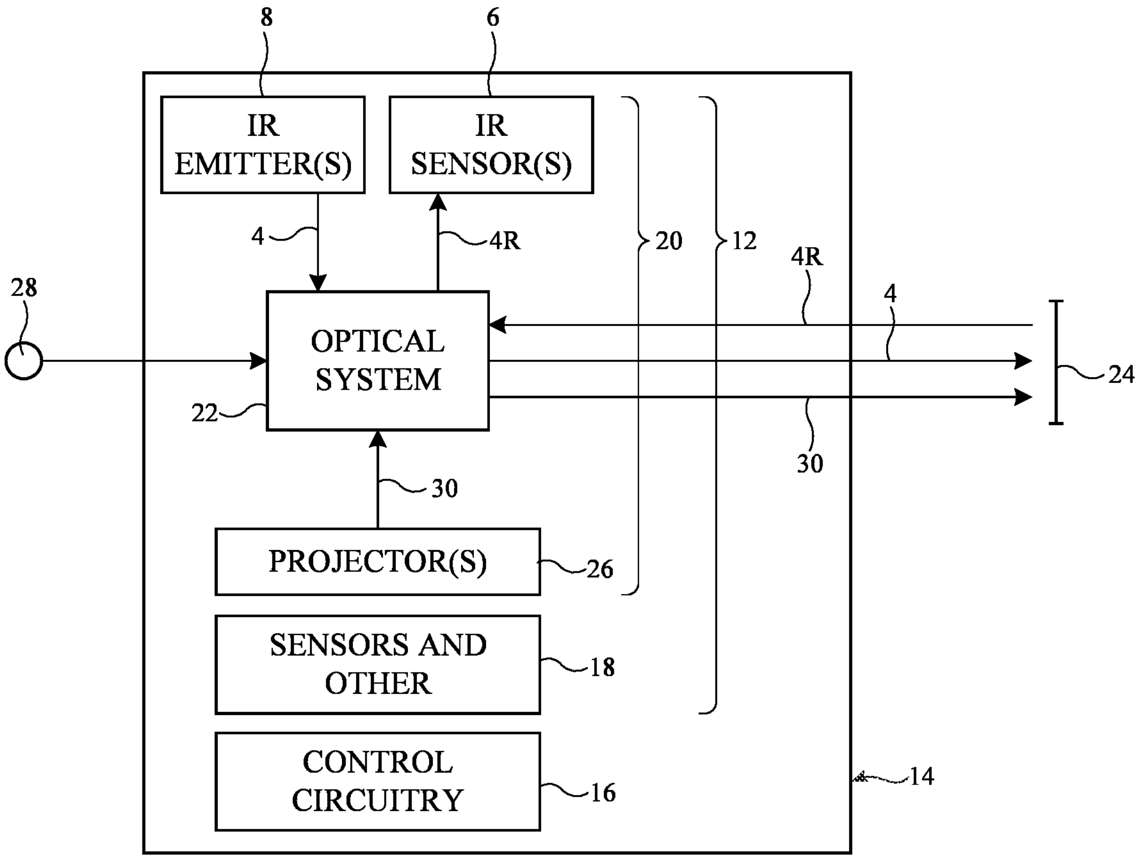
FIG. 1 is a diagram of an illustrative system having a display in accordance with some embodiments.

System 10 of FIG. 1 may be an electronic device such as a head-mounted device having one or more displays. The displays in system 10 may include near-eye displays 20 mounted within support structure such as housing 14. Housing 14 may have the shape of a pair of eyeglasses or goggles (e.g., supporting frames), may form a housing having a helmet shape, or may have other configurations to help in mounting and securing the components of near-eye displays 20 on the head or near the eye of a user. Near-eye displays 20 may include one or more display projectors such as projectors 26 (sometimes referred to herein as display modules 26) and one or more optical systems such as optical systems 22. Projectors 26 may be mounted in a support structure such as housing 14. Each projector 26 may emit image light 30 that is redirected towards a user's eyes at eye box 24 using an associated one of optical systems 22. Image light 30 may be, for example, visible light (e.g., including wavelengths from 400-700 nm) that contains and/or represents something viewable such as a scene or object (e.g., as modulated onto the image light using the image data provided by the control circuitry to the display module).

The operation of system 10 may be controlled using control circuitry 16. Control circuitry 16 may include storage and processing circuitry for controlling the operation of system 10. Control circuitry 16 may include storage such as hard disk drive storage, nonvolatile memory (e.g., electrically-programmable-read-only memory configured to form a solid state drive), volatile memory (e.g., static or dynamic random-access-memory), etc. Processing circuitry in control circuitry 16 may include one or more processors (e.g., microprocessors, microcontrollers, digital signal processors, baseband processors, etc.), power management units, audio chips, graphics processing units, application specific integrated circuits, and other integrated circuits. Software code may be stored on storage in control circuitry 16 and run on processing circuitry in control circuitry 16 to implement operations for system 10 (e.g., data gathering operations, operations involving the adjustment of components using control signals, image rendering operations to produce image content to be displayed for a user, etc.).

System 10 may include input-output circuitry such as input-output devices 12. Input-output devices 12 may be used to allow data to be received by system 10 from external equipment (e.g., a tethered computer, a portable device such as a handheld device or laptop computer, or other electrical equipment) and to allow a user to provide head-mounted device 10 with user input. Input-output devices 12 may also be used to gather information on the environment in which system 10 (e.g., head-mounted device 10) is operating. Output components in devices 12 may allow system 10 to provide a user with output and may be used to communicate with external electrical equipment. Input-output devices 12 may include sensors and other components 18 (e.g., image sensors for gathering images of real-world object that are digitally merged with virtual objects on a display in system 10, accelerometers, depth sensors, light sensors, haptic output devices, speakers, batteries, wireless communications circuits for communicating between system 10 and external electronic equipment, etc.).

Projectors 26 may include liquid crystal displays, organic light-emitting diode displays, laser-based displays, or displays of other types. Projectors 26 may include light sources, emissive display panels, transmissive display panels that are illuminated with illumination light from light sources to produce image light, reflective display panels such as digital micromirror display (DMD) panels and/or liquid crystal on silicon (LCOS) display panels that are illuminated with illumination light from light sources to produce image light 30, etc.

Optical systems 22 may form lenses that allow a viewer (see, e.g., a viewer's eyes at eye box 24) to view images on display(s) 20. There may be two optical systems 22 (e.g., for forming left and right lenses) associated with respective left and right eyes of the user. A single display 20 may produce images for both eyes or a pair of displays 20 may be used to display images. In configurations with multiple displays (e.g., left and right eye displays), the focal length and positions of the lenses formed by system 22 may be selected so that any gap present between the displays will not be visible to a user (e.g., so that the images of the left and right displays overlap or merge seamlessly).

If desired, optical system 22 may contain components (e.g., an optical combiner formed from reflective components, diffractive components, a waveguide, a direct view optical combiner, etc.) to allow real-world light (sometimes referred to as world light) from real-world (external) objects such as real-world (external) object 28 to be combined optically with virtual (computer-generated) images such as virtual images in image light 30. In this type of system, which is sometimes referred to as an augmented reality system, a user of system 10 may view both real-world content (e.g., world light from object 28) and computer-generated content that is overlaid on top of the real-world content. Camera-based augmented reality systems may also be used in device 10 (e.g., in an arrangement in which a camera captures real-world images of object 28 and this content is digitally merged with virtual content at optical system 22).

System 10 may, if desired, include wireless circuitry and/or other circuitry to support communications with a computer or other external equipment (e.g., a computer that supplies display 20 with image content). During operation, control circuitry 16 may supply image content to display 20. The content may be remotely received (e.g., from a computer or other content source coupled to system 10) and/or may be generated by control circuitry 16 (e.g., text, other computer-generated content, etc.). The content that is supplied to display 20 by control circuitry 16 may be viewed by a viewer at eye box 24.

If desired, system 10 may include an optical sensor. The optical sensor may be used to gather optical sensor data associated with a user's eyes at eye box 24. The optical sensor may, for example, be a gaze tracking sensor that gathers optical sensor data such as gaze image data (gaze tracking image data or gaze tracking sensor data) from a user's eye at eye box 24. Control circuitry 16 may process the optical sensor data to identify and track the direction of the user's gaze in real time. Control circuitry 16 may perform any desired operations based on the tracked direction of the user's gaze over time.

As shown in FIG. 1, the optical sensor (gaze tracking sensor) may include one or more optical emitters such as infrared emitter(s) 8 and one or more optical receivers (sensors) such as infrared sensor(s) 6 (sometimes referred to herein as optical sensor 6). Infrared emitter(s) 8 may include one or more light sources that emit sensing light such as light 4. Light 4 may be used for performing optical sensing on/at eye box 24 (e.g., gaze tracking) rather than conveying pixels of image data such as in image light 30. Light 4 may include infrared light. The infrared light may be at infrared (IR) wavelengths and/or near-infrared (NIR) wavelengths (e.g., any desired wavelengths from around 700 nm to around 15 microns). Light 4 may additionally or alternatively include wavelengths less than 700 nm if desired. Light 4 may sometimes be referred to herein as sensor light 4.

Infrared emitter(s) 8 may direct light 4 towards optical system 22. Optical system 22 may direct the light 4 emitted by infrared emitter(s) 8 towards eye box 24. Light 4 may reflect off portions (regions) of the user's eye at eye box 24 as reflected light 4R (sometimes referred to herein as reflected sensor light 4R, which is a reflected version of light 4). Optical system 22 may receive reflected light 4R and may direct reflected light 4R towards infrared sensor(s) 6. Infrared sensor(s) 6 may receive reflected light 4R from optical system 22 and may gather (e.g., generate, measure, sense, produce, etc.) optical sensor data in response to the received reflected light 4R. Infrared sensor(s) 6 may include an image sensor or camera (e.g., an infrared image sensor or camera), for example. Infrared sensor(s) 6 may include, for example, one or more image sensor pixels (e.g., arrays of image sensor pixels). The optical sensor data may include image sensor data (e.g., image data, infrared image data, one or more images, etc.). Infrared sensor(s) 6 may pass the optical sensor data to control circuitry 16 for further processing.

Figure 2:
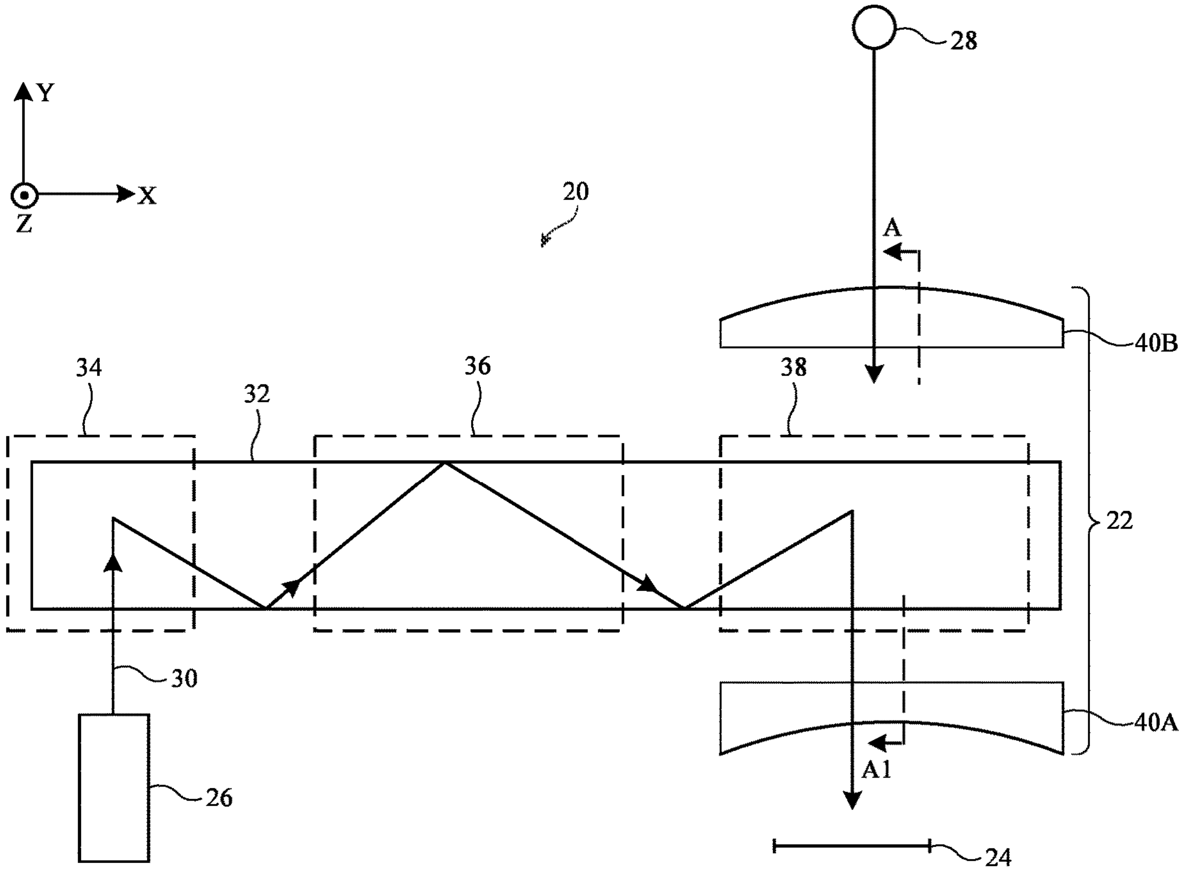
FIG. 2 is a top view of an illustrative optical system for a display having a waveguide with a lens for providing a virtual object overlaid with a real-world object to an eye box in accordance with some embodiments.

FIG. 2 is a top view of an illustrative display 20 that may be used in system 10 of FIG. 1. As shown in FIG. 2, display 20 may include a projector such as projector 26 and an optical system such as optical system 22. Optical system 22 may include optical elements such as one or more waveguides 32. Waveguide 32 may include one or more stacked substrates (e.g., stacked planar and/or curved layers sometimes referred to herein as waveguide substrates) of optically transparent material such as plastic, polymer, glass, etc.

If desired, waveguide 32 may also include one or more layers of holographic recording media (sometimes referred to herein as holographic media, grating media, or diffraction grating media) on which one or more diffractive gratings are recorded (e.g., holographic phase gratings, sometimes referred to herein as holograms, surface relief gratings, etc.). A holographic recording may be stored as an optical interference pattern (e.g., alternating regions of different indices of refraction) within a photosensitive optical material such as the holographic media. The optical interference pattern may create a holographic phase grating that, when illuminated with a given light source, diffracts light to create a three-dimensional reconstruction of the holographic recording. The holographic phase grating may be a non-switchable diffractive grating that is encoded with a permanent interference pattern or may be a switchable diffractive grating in which the diffracted light can be modulated by controlling an electric field applied to the holographic recording medium. Multiple holographic phase gratings (holograms) may be recorded within (e.g., superimposed within) the same volume of holographic medium if desired. The holographic phase gratings may be, for example, volume holograms or thin-film holograms in the grating medium. The grating medium may include photopolymers, gelatin such as dichromated gelatin, silver halides, holographic polymer dispersed liquid crystal, or other suitable holographic media.

Diffractive gratings on waveguide 32 may include holographic phase gratings such as volume holograms or thin-film holograms, meta-gratings, or any other desired diffractive grating structures. The diffractive gratings on waveguide 32 may also include surface relief gratings (SRGs) formed on one or more surfaces of the substrates in waveguide 32 (e.g., as modulations in thickness of a SRG medium layer), gratings formed from patterns of metal structures, etc. The diffractive gratings may, for example, include multiple multiplexed gratings (e.g., holograms) that at least partially overlap within the same volume of grating medium (e.g., for diffracting different colors of light and/or light from a range of different input angles at one or more corresponding output angles). Other light redirecting elements such as louvered mirrors may be used in place of diffractive gratings in waveguide 32 if desired.

As shown in FIG. 2, projector 26 may generate (e.g., produce and emit) image light 30 associated with image content to be displayed to eye box 24 (e.g., image light 30 may convey a series of image frames for display at eye box 24). Image light 30 may be collimated using a collimating lens in projector 26 if desired. Optical system 22 may be used to present image light 30 output from projector 26 to eye box 24. If desired, projector 26 may be mounted within support structure 14 of FIG. 1 while optical system 22 may be mounted between portions of support structure 14 (e.g., to form a lens that aligns with eye box 24). Other mounting arrangements may be used, if desired.

Optical system 22 may include one or more optical couplers (e.g., light redirecting elements) such as input coupler 34, cross-coupler 36, and output coupler 38. In the example of FIG. 2, input coupler 34, cross-coupler 36, and output coupler 38 are formed at or on waveguide 32. Input coupler 34, cross-coupler 36, and/or output coupler 38 may be completely embedded within the substrate layers of waveguide 32, may be partially embedded within the substrate layers of waveguide 32, may be mounted to waveguide 32 (e.g., mounted to an exterior surface of waveguide 32), etc.

Waveguide 32 may guide image light 30 down its length via total internal reflection. Input coupler 34 may be configured to couple image light 30 from projector 26 into waveguide 32 (e.g., within a total-internal reflection (TIR) range of the waveguide within which light propagates down the waveguide via TIR), whereas output coupler 38 may be configured to couple image light 30 from within waveguide 32 (e.g., propagating within the TIR range) to the exterior of waveguide 32 and towards eye box 24 (e.g., at angles outside of the TIR range). Input coupler 34 may include an input coupling prism, an edge or face of waveguide 32, a lens, a steering mirror or liquid crystal steering element, diffractive grating structures (e.g., volume holograms, SRGs, etc.), partially reflective structures (e.g., louvered mirrors), or any other desired input coupling elements.

As an example, projector 26 may emit image light 30 in direction +Y towards optical system 22. When image light 30 strikes input coupler 34, input coupler 34 may redirect image light 30 so that the light propagates within waveguide 32 via total internal reflection towards output coupler 38 (e.g., in direction +X within the TIR range of waveguide 32). When image light 30 strikes output coupler 38, output coupler 38 may redirect image light 30 out of waveguide 32 towards eye box 24 (e.g., back along the Y-axis). In implementations where cross-coupler 36 is formed on waveguide 32, cross-coupler 36 may redirect image light 30 in one or more directions as it propagates down the length of waveguide 32 (e.g., towards output coupler 38 from a direction of propagation as coupled into the waveguide by the input coupler). In redirecting image light 30, cross-coupler 36 may also perform pupil expansion on image light 30 in one or more directions. In expanding pupils of the image light, cross-coupler 36 may, for example, help to reduce the vertical size of waveguide 32 (e.g., in the Z direction) relative to implementations where cross-coupler 36 is omitted. Cross-coupler 36 may therefore sometimes also be referred to herein as pupil expander 36 or optical expander 36. If desired, output coupler 38 may also expand image light 30 upon coupling the image light out of waveguide 32.

Input coupler 34, cross-coupler 36, and/or output coupler 38 may be based on reflective and refractive optics or may be based on diffractive (e.g., holographic) optics. In arrangements where couplers 34, 36, and 38 are formed from reflective and refractive optics, couplers 34, 36, and 38 may include one or more reflectors (e.g., an array of micromirrors, partial mirrors, louvered mirrors, or other reflectors). In arrangements where couplers 34, 36, and 38 are based on diffractive optics, couplers 34, 36, and 38 may include diffractive gratings (e.g., volume holograms, surface relief gratings, etc.).

The example of FIG. 2 is merely illustrative. Optical system 22 may include multiple waveguides that are laterally and/or vertically stacked with respect to each other. Each waveguide may include one, two, all, or none of couplers 34, 36, and 38. Waveguide 32 may be at least partially curved or bent if desired. One or more of couplers 34, 36, and 38 may be omitted. If desired, optical system 22 may include a single optical coupler that performs the operations of both cross-coupler 36 and output coupler 38 (sometimes referred to herein as an interleaved coupler, a diamond coupler, or a diamond expander) or cross-coupler 36 may be separate from output coupler 38.

The operation of optical system 22 on image light 30 is shown in FIG. 2. Optical system 22 may also direct light 4 from infrared emitter(s) 8 towards eye box 24 and may direct reflected light 4R from eye box 24 towards infrared sensor (s) 6 (FIG. 1). In addition, output coupler 38 may form an optical combiner for image light 30 and world light from real-world objects such as real-world object 28. As shown in FIG. 2, world light from real-world object 28 may pass through output coupler 38, which transmits the world light (e.g., without diffracting the world light) to eye box 24.

Image light 30 may include images of virtual objects, sometimes referred to herein as virtual object images or simply as virtual objects. Projector 26 may receive image data that includes the virtual object images (e.g., pixels of image data at different pixel locations that form the virtual object images). Output coupler 38 may serve to overlay the virtual object images with world light from real-world object 28 within the field of view (FOV) of eye box 24. The control circuitry for system 10 may provide image data to projector 26 that places the virtual object images at desired locations within the FOV at eye box 24 (e.g., such that the virtual object images are overlaid with desired real-world objects in the scene/environment in front of system 10.)

Optical system 22 may include one or more lenses 40 that overlap output coupler 38. For example, optical system 22 may include at least a first lens 40A and a second lens 40B. Lens 40B may be interposed between waveguide 32 and real-world object 28. Lens 40A may be interposed between waveguide 32 and eye box 24. Lenses 40 are transparent and allow world light from real-world object 28 to pass to eye box 24 for viewing by the user. At the same time, the user can view virtual object images directed out of waveguide 32 and through lens 40A to eye box 24.

The strength (sometimes referred to as the optical power, power, or diopter) of lens 40A can be selected to place virtual object images in image light 30 at a desired image distance (depth) from eye box 24 (sometimes referred to herein as a virtual object distance, virtual object image distance, virtual image distance (VID), virtual object depth, virtual image depth, or image depth). For example, it may be desirable to place virtual objects (virtual object images) such as text, icons, moving images, characters, effects, or other content or features at a certain virtual image distance (e.g., to integrate the virtual object image within, onto, into, or around the real-world objects in front of system 10). The placement of the virtual object at that distance can be accomplished by appropriate selection of the strength of lens 40A. Lens 40A may be a negative lens for users whose eyes do not have refraction errors. The strength (larger net negative power) of lens 40A can therefore be selected to adjust the distance (depth) of the virtual object. Lens 40A may therefore sometimes be referred to herein as bias lens 40A or bias− (B−) lens 40A.

If desired, lens 40B may have a complementary power value (e.g., a positive power with a magnitude that matches the magnitude of the negative power of lens 40A). Lens 40B may therefore sometimes be referred to herein as bias+ (B+) lens 40B, complementary lens 40B, or compensation lens 40B. For example, if lens 40A has a power of −2.0 diopter, lens 40B may have an equal and opposite power of +2.0 diopter (as an example). In this type of arrangement, the positive power of lens 40B cancels the negative power of lens 40A. As a result, the overall power of lenses 40A and 40B taken together will be 0 diopter. This allows a viewer to view real-world objects such as real-world object 28 without optical influence from lenses 40A and 40B. For example, a real-world object 28 located far away from system 10 (effectively at infinity), may be viewed as if lenses 40A and 40B were not present.

For a user with satisfactory uncorrected vision, this type of complementary lens arrangement therefore allows virtual objects to be placed in close proximity to the user (e.g., at a virtual image distance of 0.5-5 m, at least 0.1 m, at least 1 m, at least 2 m, less than 20 m, less than 10 m, less than 5 m, or other suitable near-to-midrange distance from device 10 while simultaneously allowing the user to view real world objects without modification by the optical components of the optical system). For example, a real-world object located at a distance of 2 m from device 10 (e.g., a real-world object being labeled by a virtual text label at a virtual image distance of 2 m) will optically appear to be located 2 m from device 10. This is merely illustrative and, if desired, lenses 40A and 40B need not be complementary lenses (e.g., lenses 40A and 40B may have any desired optical powers).

In addition, some users may require vision correction. Vision correction may be provided using tunable lenses, fixed (e.g., removable) lenses (sometimes referred to as supplemental lenses, vision correction lenses, removable lenses, or clip-on lenses), and/or by adjusting the optical power of lens 40A and/or lens 40B to implement the desired vision correction. In general, the vision correction imparted to the lens(es) may include corrections for ammetropia (eyes with refractive errors) such as lenses to correct for near-sightedness (myopia), corrections for farsightedness (hyperopia), corrections for astigmatism, corrections for skewed vision, corrections to help accommodate age-related reductions in the range of accommodation exhibited by the eyes (sometimes referred to as presbyopia), and/or other vision disorders.

Lenses 40A and 40B may be provided with any desired optical powers and any desired shapes (e.g., may be plano-convex lenses, plano-concave lenses, plano-freeform lenses, freeform-convex lenses, freeform-concave lenses, convex-concave lenses, etc.). Implementations in which the optical power(s) of lenses 40A and/or 40B are fixed (e.g., upon manufacture) are described herein as an example. If desired, one or both of lenses 40A and/or 40B may be electrically adjustable to impart different optical powers or power profiles over time (e.g., lenses 40A and/or 40B may be adjustable/tunable liquid crystal lenses).

The vergence-accommodation conflict (VAC) is a documented phenomenon regarding the comfort of viewing three-dimensional images generated by near-to-eye displays such as system 10. Some systems (e.g., extended-reality (XR) systems) mitigate VAC by placing virtual objects at a fixed virtual image distance (VID), where lens 40A is provided with a focal length that places the virtual objects at the fixed VID and the fixed VID is selected to minimize viewing discomfort when viewing the virtual objects projected within the working range of the system. In such systems, VAC is generally greatest at short VIDs such as 0.5 m or less.

In augmented reality systems such as optical system 22 of FIG. 2 in which the virtual object image is superimposed over real-world objects 28, a focus conflict arises when a virtual object image at a first VID is superimposed over a real-world object 28 that is located at a different distance from eye box 24. For example, it may not be possible for the eye to focus on both the virtual object image and the real-world object, even in a monocular context. However, in most every day real-world conditions, real-world objects 28 in the lower part of the FOV of eye box 24 tend to be closer to eye box 24 than objects in the upper part of the FOV of eye box 24.

For example, when an observer is reading a book, the book is held in hand at around 0.5 m from the observer and occupies the lower portion of the FOV, whereas the background scene at 10-100+m from the observer is located in the upper part of the FOV. As another example, when a user is driving a car, the lower portion of the driver's FOV is occupied by controls and displays for the car, which are located around 40 cm from the driver. On the other hand, the car directly ahead of the driver is typically located around the middle of the FOV and around 10 m from the driver, and the background scene is located around the top of the FOV and around 100-100+m from the driver. As yet another example, when an observer is manipulating or preparing ingredients for a meal in their kitchen, the ingredients are typically within arm's reach (e.g., within 40 cm) and within the bottom portion of the observer's FOV. The observer may be following a written or displayed recipe that is just out of arm's length (e.g., around 70 cm) and that occupies the middle of the observer's FOV. At the same time, the observer may be watching television or observing children in the background at a distance of several meters, occupying the top portion of the observer's FOV.

Figure 3:
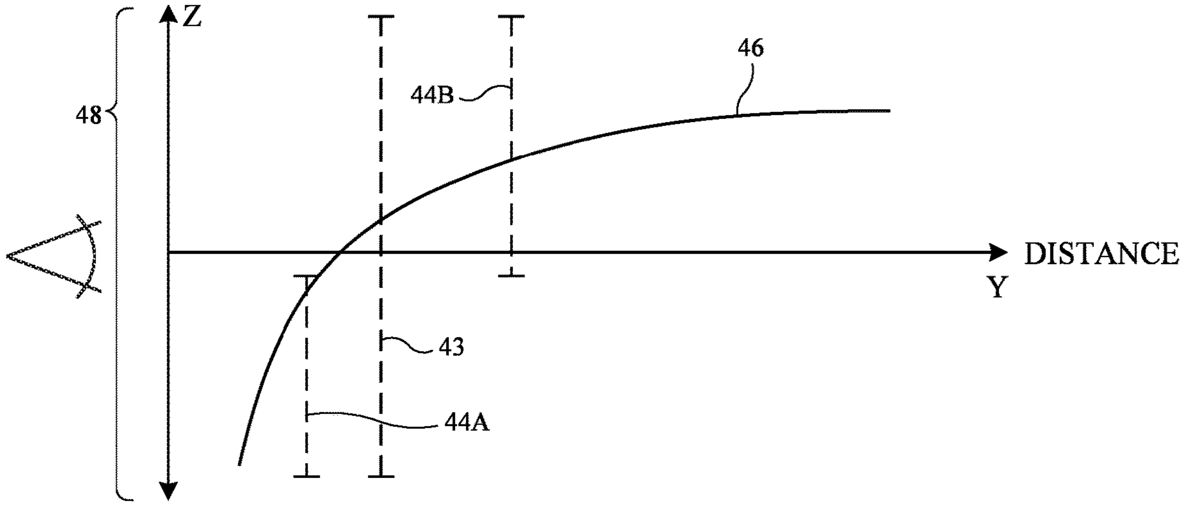
FIG. 3 is a plot showing how virtual objects may be provided at different virtual image depths in different portions of a field of view to match expected distances to real-world objects in accordance with some embodiments.

FIG. 3 is a plot showing the general trend in real-world object distance as a function of elevation angle (e.g., measured about the center of eye box 24 and relative to the Y-axis) of the user's eye at eye box 24 when wearing system 10. As shown in FIG. 3, the user may have an FOV 48 while their eye is located at eye box 24. FOV 48 may sometimes be referred to herein as the FOV of eye box 24 or the FOV of lens 40A. Curve 46 of FIG. 3 plots the general trend in the distance between eye box 24 and real-world objects 28 in the most common real-world conditions. As shown by curve 46, real-world objects that are located closer to the eye box tend to be located at lower elevation angles (e.g., lower points along the Z axis as distance along the Y axis decreases) whereas real-world objects that are located farther from the eye box tend to be located at higher elevation angles (e.g., higher points along the Z axis as distance along the Y axis increases). The example of FIG. 3 is merely illustrative and, in practice, curve 46 may have other shapes.

In some implementations, lens 40A (FIG. 2) has a fixed VID 43 that is invariant (constant) across all of field of view 48. This configures the virtual object images in image light 30 to be provided to eye box 24 at the same fixed VID 43 regardless of the location of the virtual object image within FOV 48. However, comparing VID 43 with curve 46 reveals that real-world objects 28 will very often be present at distances that are substantially different from VID 43 unless located at or around an elevation angle of zero degrees. Note that in the example given with a single VID, that VID is set to match real-world content at approximately zero degree elevation angle. However, this single VID could be set to any desirable distance, not just that matching real-world content at a zero degree elevation angle. This means that for other portions of the FOV, it is very likely that real-world object 28 will be at a substantially different distance from eye box 24 than the virtual object image at VID 43, the user will be unable to properly focus on both the virtual object image and the real-world object such that one of the two objects will appear out of focus, and the display will cause viewing discomfort for the user.

To help mitigate these issues, lens 40A may exhibit different optical powers in different regions of FOV 48 (e.g., may be configured to impart image light 30 with different optical powers at different points within FOV 48). The different optical powers may configure lens 40A to provide virtual object images at different respective VIDs 44 (e.g., each optical power may place virtual object images at a different respective VID 44) within the different regions of FOV 48 to more closely match curve 46 than when a single VID 43 is used, thereby minimizing focus conflict and viewing discomfort.

For example, as shown in FIG. 3, lens 40A may have a first optical power (focal length) within a first (lower) portion of FOV 48 that configures lens 40A to provide virtual objects within the first (lower) portion of FOV 48 to eye box 24 with VID 44A, where VID 44A is selected to be relatively close to eye box 24 to best match the corresponding trend of curve 46 within the first (lower) portion of FOV 48. At the same time, lens 40A may have a second optical power that is different from (e.g., lower than) the first optical power within a second (upper) portion of FOV 48 that configures lens 40A to provide virtual objects within the second (upper) portion of FOV 48 to eye box 24 with VID 44B, where VID 44B is selected to be relatively far from eye box 24 to best match the corresponding trend of curve 46 within the second (upper) portion of FOV 48. The second optical power may correspond to a second focal length that is different from (e.g., higher than) the first focal length. In this way, the display may provide virtual object images to eye box 24 at VIDs (distances) that more closely match the most likely distance to the real-world objects 28 that will be overlaid with the virtual object images, minimizing focus conflict and thus viewing discomfort for the user.

In this example, lens 40A has a bi-focal structure in which the lens provides virtual object images at two different VIDs 44. This is merely illustrative and, in general, lens 40A may have any desired number of optical powers (focal lengths) across elevation angles within FOV 48 to provide virtual object images to eye box 24 within any desired number of VIDs. The VIDs may be selected to increase as elevation angle within the FOV increases to match curve 46 as closely as possible. If desired, lens 40A may exhibit a continuously changing optical power (focal length) across elevation angles within FOV 48 to provide virtual object images to eye box 24 at a continuous number of VIDs (e.g., VIDs that follow curve 46).

Figure 4:
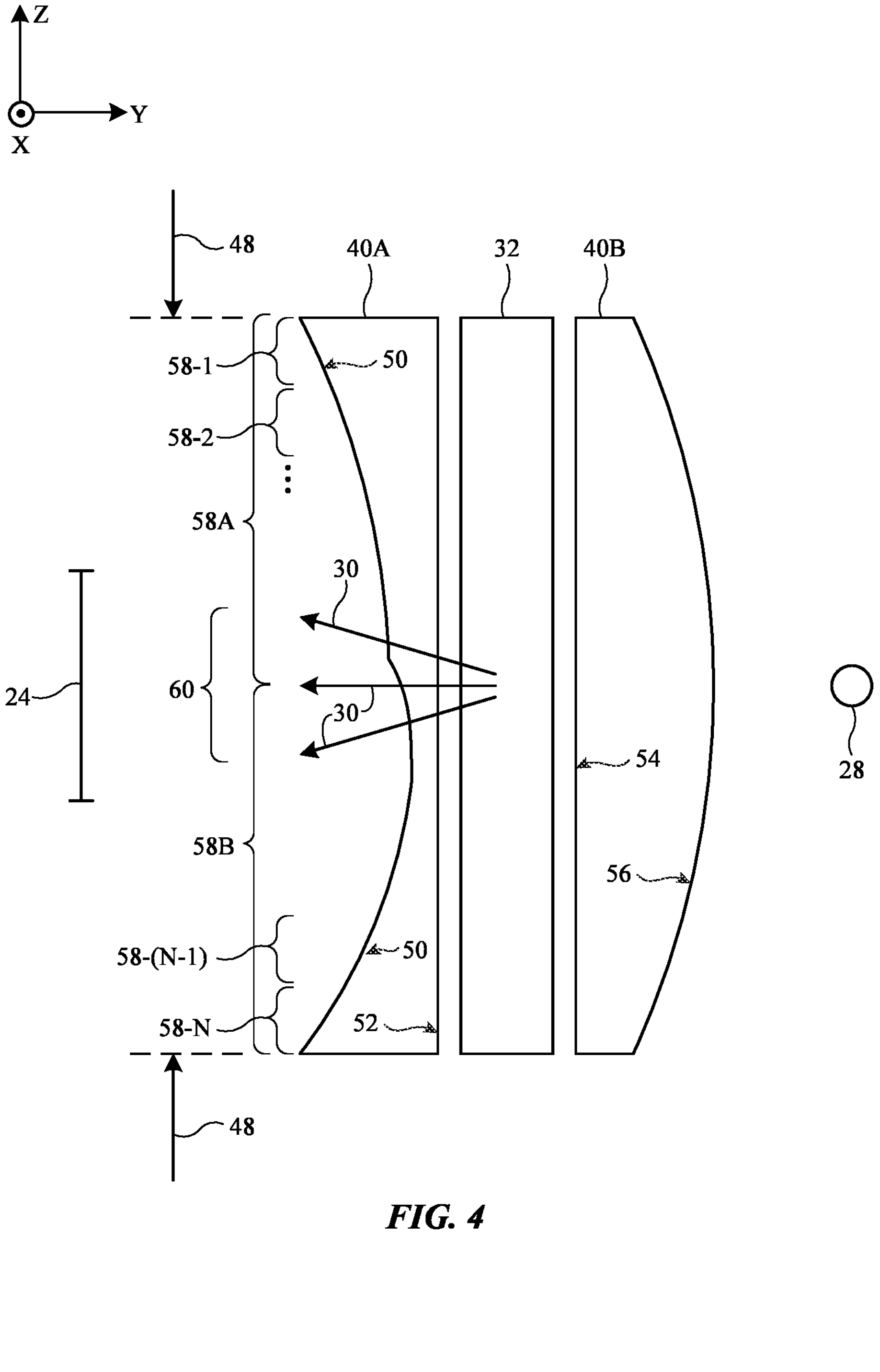
FIG. 4 is a diagram showing how a bias lens may be provided with a variable prescription across a field of view to provide virtual objects to an eye box at different virtual image depths in accordance with some embodiments.

FIG. 4 is a cross-sectional side view (e.g., taken in the direction of line AA' of FIG. 2) showing how lens 40A may be provided with different optical powers in different regions of FOV 48. As shown in FIG. 4, lens 40A may have a first surface 52 facing waveguide 32 and a second surface 50 opposite first surface 52 and facing eye box 24. Lens 40B may have a first surface 54 facing waveguide 32 and a second surface 56 opposite first surface 54 and facing real-world objects 28.

Lens 40A may provide image light 30 coupled out of waveguide 32 (e.g., by output coupler 38 of FIG. 2) to eye box 24 within FOV 48. Lens 40A may have different regions 58 that provide image light 30 to eye box 24 within different respective portions (regions) of FOV 48 and that are configured (e.g., shaped) to exhibit different respective optical powers (focal lengths) that provide virtual object images in image light 30 at different respective VIDs to eye box 24 within the corresponding portions of the FOV.

For example, in a bifocal arrangement, lens 40A may have a first region 58A that provides image light 30 to eye box 24 within a first (upper) portion of FOV 48 and may have a second region 58B that provides image light 30 to eye box 24 within a second (lower) portion of FOV 48. First region 58A may have a first optical power and a corresponding first focal length. The first optical power may be selected to place virtual object images within the first (upper) portion of FOV 48 at a first VID from eye box 24 (e.g., VID 44B of FIG. 3). One or more surfaces of lens 40A may be shaped to configure first region 58A of lens 40A to exhibit the first optical power. For example, as shown in FIG. 4, surface 50 within region 58A may have a first curvature that configures first region 58A of lens 40A to exhibit the first optical power (e.g., the first focal length). Additionally or alternatively, the materials used to form lens 40A within first region 58A may be selected to exhibit a refractive index that configures first region 58A of lens 40A to exhibit the first optical power (e.g., lens 40A may be formed from a gradient index material).

At the same time, second region 58B may have a second optical power and a corresponding second focal length that are different from the first optical power and the first focal length. The second optical power may be selected to place virtual object images within the second (lower) portion of FOV 48 at a second VID from eye box 24 that is different from (e.g., less than) the first VID. The second optical power may, for example, be greater than the first optical power and the second focal length may be less than the first focal length (e.g., the second VID may be VID 44A of FIG. 3). One or more surfaces of lens 40A may be shaped to configure second region 58B of lens 40A to exhibit the second optical power. For example, as shown in FIG. 4, surface 50 within second region 58B may have a second curvature that is different from the first curvature and that configures region 58B of lens 40A to exhibit the second optical power (e.g., the second focal length). Additionally or alternatively, the materials used to form lens 40A within second region 58B may be selected to exhibit a refractive index that configures second region 58B of lens 40A to exhibit the second optical power.

The example in which lens 40A has two regions 58 with different optical powers for placing virtual object images at two different VIDs (e.g., a bi-focal arrangement) is merely illustrative. In general, lens 40A may have N regions 58 extending across different elevation angles of FOV 58 (e.g., a first region 58-1, a second region 58-2, an (N−1)th region 58-(N−1), an Nth region 58-N, etc.). Each of the N regions 58 may have a different respective optical power or focal length. The optical powers (focal lengths) may place the virtual objects in the image light 30 that passes through the corresponding region 58 of lens 40A at a different respective VID 44. The optical powers (focal lengths) may be selected such that the VIDs follow the trend of curve 46 of FIG. 3 (e.g., increasing focal length, decreasing optical power, and increasing VID as elevation angle within FOV 48 increases). If desired, lens 40A may have a continuously variable optical power (focal length) across elevation angles of FOV 48 to place the virtual object images in eye box 24 at VIDs following curve 46 of FIG. 3 (e.g., N may approach infinity). In this way, optical lens 40A may mitigate focus conflict for the display and maximize viewing comfort for the user.

Lens 40B may be configured to reverse the effects of lens 40A on world light from real-world object 28 by the time the world light reaches eye box 24. For example, lens 40B may have different regions that each exhibit a respective optical power (focal length) that effectively reverses the optical power (focal length) of the corresponding region 58 of lens 40A. This allows the real-world objects 28 to appear undistorted when viewed at eye box 24. In the example of FIG. 4 in which lens 40A has regions 58A and 58B, lens 40B may have a first region with a power that reverses the power of region 58A and may have a second region with a power that reverses the power of region 58B. There may be an offset in the Z direction between the location where the first region transitions to the second region in lens 40B relative to where region 58A transitions to region 58B in lens 40A, based on the viewing angle where the transition occurs. As such, the first region of lens 40B may overlap at least some of region 58A (when viewed in the −Y direction) but may also overlap at least some of region 58B and/or the second region of lens 40B may overlap region 58B but none of region 58A of lens 40A.

In the example of FIG. 4, surface 50 of lens 40A is curved to place virtual object images at different VIDs for different portions of FOV 48. This is merely illustrative. Additionally or alternatively, surface 52 may be curved to place virtual object images at different VIDs for different portions of FOV 48. Additionally or alternatively, the material composition (e.g., refractive index gradient) of lens 40A may be configured to place virtual object images at different VIDs for different portions of FOV 48. Surface 56 and/or surface 54 of lens 40B may be curved and/or the material composition (e.g., refractive index gradient) of lens 40B may be configured to reverse the effects of lens 40A on world light.

In the example of FIG. 4, lens 40A is a plano-concave lens (e.g., where surface 52 is planar and surface 50 is concave) and lens 40B is a plano-convex lens (e.g., where surface 54 is planar and surface 56 is convex). This is merely illustrative. In general, lens 40A and/or lens 40B may be plano-concave, plano-convex, plano-freeform lenses, freeform-convex lenses, freeform-concave lenses, convex-concave lenses, or any other desired lenses. More generally, surfaces 50, 52, 54, and 56 may have free-form curvatures (e.g., surface 50 may have one or more regions 58 with free-form curvatures), convex curvatures, concave curvatures, compound curvatures (e.g., combinations of different curvatures), etc.

Figure 5:
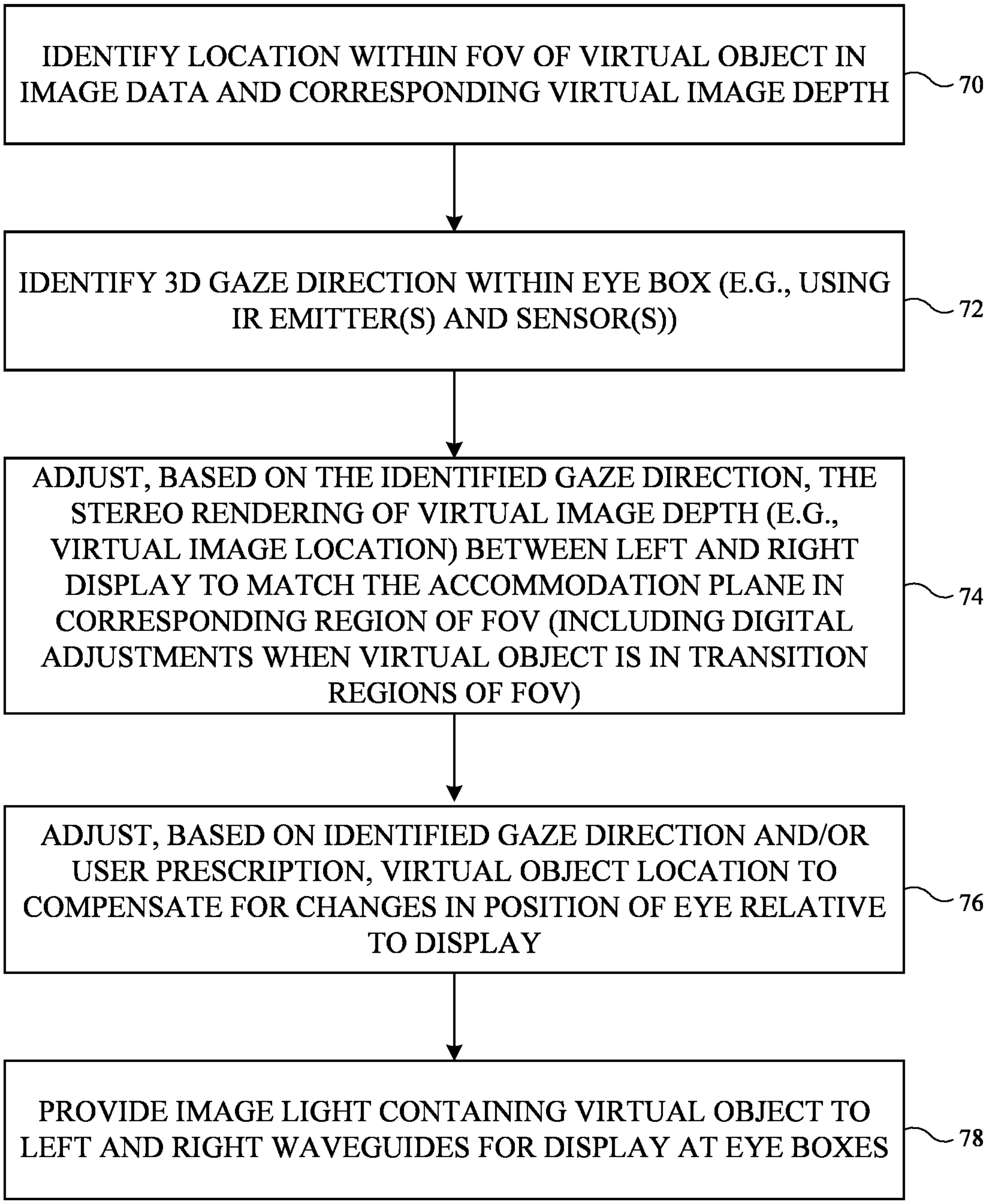
FIG. 5 is a flow chart of illustrative operations involved in operating a system of the type shown in FIGS. 1-4 in accordance with some embodiments.

If desired, control circuitry 16 may adjust image data provided to projector(s) 26 (FIG. 1) for producing image light 30 to help to accommodate the variable VID produced by lens 40A. FIG. 5 is a flow chart of operations that may be performed by the display to provide virtual object images to image light 30 (e.g., overlaid with world light from real-world objects 28).

At operation 70, control circuitry 16 (FIG. 1) may identify the location of a virtual object within the image data to be displayed (e.g., a set of pixels or pixel locations spanned by the virtual object). The control circuitry may also identify the VID for the virtual object.

At operation 72, the control circuitry may identify a gaze direction of a user's eyes at eye boxes 24 (e.g., the left and the right eye box). For example, IR emitter(s) 8 and IR sensor(s) 6 (FIG. 1) may reflect IR light off the user's eyes to identify the gaze direction. The gaze direction may be a three-dimensional gaze direction (e.g., because the three-dimensional position of the user's pupil will change as they rotate their eye within eye box 24 given the three-dimensional curvature of the eye). The three-dimensional gaze direction may also reveal information about how the system is being word on the user's head.

At operation 74, the control circuitry may adjust the stereo rendering of the virtual object image between the left and the right displays (eye boxes) (e.g., may digitally adjust the image data provided to the projector for the left display and the projector for the right display) based on the identified gaze direction and the VID for the virtual object to minimize VAC and thus maximize viewing comfort (e.g., to match the accommodation plane in different regions of the FOV). For example, when the user looks downwards within eye boxes 24, the control circuitry may adjust the image data for the virtual object image between the left and right eyes to mimic the vergence that matches the accommodation produced by lens 40A.

In implementations where lens 40A includes a discrete number of regions 58 (e.g., first region 58A and second region 58B of FIG. 4), this may include performing digital adjustments to the image data to compensate for situations when the virtual object is located in a transition region between different regions 58 and thus between different VIDs producible by the lens (e.g., within transition region 60 between regions 58A and 58B). These adjustments may include content policies to cut virtual objects as the virtual objects move between regions 58, performing distortions to the virtual objects within transition region 60, including a dead zone in the FOV overlapping transition region 60 where virtual objects are not rendered, and/or any other desired rendering treatments to make virtual objects extending into transition region 60 or between any two regions 58 have a desired visual appearance or quality.

At operation 76, the control circuitry may adjust, based on the identified gaze direction and/or a prescription of the user, the location of the virtual object in the image data to compensate for changes in the three-dimensional position of the eye relative the display. This adjustment may, for example, ensure that the virtual object images are provided to the correct portion of the FOV to pass through the corresponding region 58 of lens 40A that provide the virtual object images at the desired VID (e.g., as identified at operation 70) given the current location of the user's eye within the eye box, which may change over time. This may even compensate for situations where the user pushes the display up or down on their nose to view more of one region or another.

For example, an initial calibration may be performed to map different three-dimensional gaze directions to corresponding pixels of image data. Virtual object images provided to different pixels of the displayed image frames may then be provided with different corrections based on where the user's eye is located (in three dimensions) within eye box 24. The calibration may be performed upon device set up, upon putting the system on the user's head, or in real time using gaze tracking information.

In addition, presbyopic and hyperopic (farsighted) people tend to have difficulty focusing on content close to their eyes. The corrective prescription such people wear moves the real-world image to a virtual location further from their eyes so as to allow their eyes to focus on the image. Users of system 10 having such a prescription may use system 10 with appropriately placed VIDs. Alternatively, given that nearby real-world objects have been moved in space further from the user, a single VID in combination with a progressive lens 40A and a progressive lens 40B (adjusted to account for their regular prescription) may provide sufficient optical performance (e.g., for a single VID, lens 40A would not be progressive and only lens 40B would be progressive).

At operation 78, the projectors may emit image light 30 containing the virtual object image (e.g., as optionally adjusted at operation 76 and/or as optionally adjusted between left and right projectors at operation 74) into waveguides 32, which provide the image light to the eye boxes via lenses 40A. Lenses 40A may place the virtual object image at corresponding VID(s) while minimizing focus conflict with real-world objects 28, thereby minimizing viewing discomfort for a wide range of users.

The foregoing is merely illustrative and various modifications can be made to the described embodiments. The foregoing embodiments may be implemented individually or in any combination.

What is claimed is:

1. An electronic device comprising:

a waveguide configured to propagate first light;

an optical coupler configured to couple the first light out of the waveguide within a field of view (FOV) and configured to transmit, within the FOV, second light from an external object; and a lens configured to transmit the first light and the second light, wherein the lens has a first power within a first portion of the FOV and has a second power within a second portion of the FOV, the second power being different from the first power and the second portion of the FOV being different from the first portion of the FOV, and wherein the lens has a third power within a third portion of the FOV, the third portion is different from the first portion and the second portion, and the third power is different from the first power and the second power.

2. The electronic device of claim 1, wherein the first portion of the FOV is at higher elevation angles within the FOV than the second portion of the FOV.

3. The electronic device of claim 2, wherein the first power is lower than the second power.

4. The electronic device of claim 3, further comprising:

one or more processors configured to adjust a virtual object in the first light when the virtual object overlaps a transition portion of the FOV between the first portion and the second portion of the FOV.

5. The electronic device of claim 4, wherein the one or more processors is configured to clip a portion of the virtual object overlapping the transition portion of the FOV.

6. The electronic device of claim 4, wherein the one or more processors is configured to distort the virtual object when the virtual object overlaps the transition portion of the FOV.

7. The electronic device of claim 3, further comprising:

an infrared emitter configured to emit infrared light;

an infrared sensor configured to generate sensor data based on reflected infrared light; and one or more processors configured to adjust, based on the sensor data, a location within the FOV of a virtual object in the first light.

8. The electronic device of claim 1, further comprising:

an additional lens overlapping the lens and the optical coupler, wherein the additional lens is configured to transmit the second light to the optical coupler.

9. An electronic device comprising:

a waveguide configured to propagate first light;

an optical coupler configured to couple the first light out of the waveguide within a field of view (FOV) and configured to transmit, within the FOV, second light from an external object;

a lens configured to transmit the first light and the second light, wherein the lens has a first power within a first portion of the FOV and has a second power within a second portion of the FOV, the second power being different from the first power and the second portion of the FOV being different from the first portion of the FOV; and an additional lens overlapping the lens and the optical coupler, wherein the additional lens is configured to transmit the second light to the optical coupler, wherein the additional lens has a third power within the first portion of the FOV and has a fourth power within the second portion of the FOV, the third power being opposite to the first power and the fourth power being opposite to the second power.

10. An electronic device comprising:

a waveguide configured to propagate first light;

a lens;

an optical coupler, wherein the optical coupler is configured to couple the first light out of the waveguide, the optical coupler is configured to combine second light from an external object with the first light, the lens is configured to transmit the first light and the second light within a field of view (FOV), and the lens has a focal length that varies across the FOV;

an additional waveguide configured to propagate third light, wherein the first light and the third light convey a virtual object; and one or more processors configured to adjust the first light and the third light to match a depth of the virtual object to different accommodation planes across the FOV.

11. The electronic device of claim 10, wherein the focal length varies as a function of elevation angle within the FOV.

12. The electronic device of claim 11, wherein the focal length increases as the elevation angle increases within the FOV.

13. The electronic device of claim 12, wherein the focal length continuously increases as the elevation angle increases within the FOV.

14. The electronic device of claim 10, further comprising:

an infrared emitter configured to emit infrared light;

an infrared sensor configured to generate sensor data based on reflected infrared light, wherein the one or more processors is configured to adjust the first light and the third light based on the sensor data.

* * * * *